Patented Apr. 21, 1953

2,635,976

UNITED STATES PATENT OFFICE 2,635,976

METHOD OF MAKING SYNTHETIC CONSTRUCTIONAL BOARDS AND PRODUCTS THEREOF

John G. Meiler, Earl G. Hallonquist, and August H. Rauch, Tacoma, Wash., assignors to Plywood Research Foundation, Tacoma, Wash., a nonprofit corporation of Washington No Drawing. Application June 15, 1948, Serial No. 33,214

25 Claims. (Cl. 154—132)

The present invention relates to a novel synthetic board product, a novel overlaid board product, each incorporating the presently described binding compositions, and to a method of making the same.

The binding compositions described herein comprise a phenol-formaldehyde resin and a synthetic elastomer (also termed herein in accordance with common usage, "synthetic rubber") in latex form, selected from a certain group thereof, and with or without a vulcanizing agent for the synthetic elastomer or rubber.

Certain of the solid synthetic elastomers or rubbers, notably those of the butadiene-styrene type, are not readily compatible with phenol-formaldehyde resins and tend to separate therefrom when subjected to the usual procedure of making plastic compositions. This disadvantage is especially significant from an economic standpoint, since the butadiene-styrene copolymers are relatively inexpensive as compared to either natural rubber or many of the synthetic elastomers or rubbers. It is therefore desirable to provide a method for utilizing these relatively inexpensive raw materials as constituents of binding compositions to produce synthetic boards or boards having a base and a synthetic overlay secured thereto.

It is an object of the present invention that the foregoing and other disadvantages of the prior art methods for compounding synthetic rubbers with phenol-formaldehyde resins may be eliminated by using the synthetic rubber or elastomer in latex form, i. e., in the form of a dispersion of solid particles of the synthetic rubber in a suitable suspending medium such as water. When thus employed, even the stubborn butadiene-styrene copolymers blend readily with the phenol-formaldehyde resin to form binding compositions which effectively will coat and bind together particles of base materials with which they are brought in contact. Furthermore, the procedure whereby the two constituents of the compositions are compounded is transformed from a tedious, difficult and relatively expensive operation which must be carried out on mixing rolls or similar apparatus to a simple mixing procedure wherein the two components are blended together rapidly and inexpensively in stirring type mixers of conventional construction.

It is a further significant teaching of the present invention that the hereindescribed binding composition may be used to advantage in binding together particles of base materials such as wood to form mixtures which, when heated and pressed under conditions similar to hot pressing of plywood, may be converted to synthetic board products or board products having a synthetic overlay having properties of water absorption, swelling, and impact strength which are well within the acceptable range for constructional materials, such as panel board, hard board and flooring. This result is obtained even though the base material is sawdust or wood flour which, in contradistinction to wood fiber, are not ordinarily considered as lending themselves to the manufacture of structurally strong board products. The properties of many of the boards are, furthermore, unexpectedly better than those of boards prepared by using either a phenol-aldehyde resin binder or a synthetic rubber alone as a binder.

The synthetic elastomers or rubbers which we have demonstrated to be suitable as constituents of the binding compositions of the present invention include the following:

Butadiene-acrylonitrile copolymer ("Penbunan," "Buma N," "GRN," or "Hycar")
Butadiene-styrene copolymer ("Buna S" or "GRS")
2-chlorobutadiene-1,3 polymer, or chloroprene ("Neoprene" or "Duprene")
Vinyl chloride polymer ("Geon" or "Koroseal")

These synthetic rubbers may be used in the form of their aqueous suspensions containing from about 30 percent to about 70 percent by weight solids and may be employed either singly or in admixture with each other. Preferred for the purposes of the instant invention are the butadiene-acrylonitrile copolymers and the butadiene-styrene copolymers, typical samples of which are characterized in Table I.

TABLE I

| | Butadiene/Acrylonitrile Copolymer—"Hycar OR25" | Butadiene/Styrene Copolymer—"GRS Type III" |
|---|---|---|
| Component Ratio (by weight) | 70/30 | 50/50. |
| Latex Composition (percent solids by weight) | 40 | 38. |
| Emulsifier | Fatty Acid Soap. | Resin Soap (3% by wt.). |
| Viscosity (cp. at 25° C.) | 42 | 6.5–7. |
| pH | 8.5–9.5 | 10–11. |
| Surface Tension (dynes/cm.) | 51 | 45. |

The phenol-formaldehyde resinous condensation products employed herein are typified by the water miscible phenol-formaldehyde condensation products marketed under the trade name of "Durez 13461" as a liquid containing 65% by weight solids; and by the water miscible phenol formaldehyde condensation product marketed under the trade name of "Plyophen 5015," the same being an aqueous suspension containing from 68 to 70 percent by weight solids.

There also may be incorporated in accordance with the present invention a vulcanizing agent such as elemental sulphur or zinc oxide together with an appropriate accelerator therefor such as thiocarbanilide, benzothiazyl disulfide or diphenylguanidine. Then when the compositions are utilized in the manufacture of pressed articles in a manner to the described hereinafter, the vulcanizing agent hardens the synthetic rubber and imparts to the pressed product qualities of hardness and durability which may be desirable in some applications. The amount of vulcanizing agent employed is variable, there being employed in general a sufficient amount to vulcanize the synthetic rubber present, i. e., a "vulcanizing amount" of vulcanizing agent.

The synthetic rubber latex, liquid phenol-aldehydate resin, and vulcanizing agent components of the herein described binding compositions may be used in varying proportions depending in part upon the particular use to which the compositions are to be put. Also, although some water is introduced via the synthetic rubber latex and the liquid phenol form aldehyde resin, more may be added if it is desired to reduce the viscosity of the mixture to promote better mixing.

Typical formulations suitable for use in the manufacture of hard board from wood flour or sawdust are as follows:

TABLE II

| | "GRN"—Parts by Weight (solids basis) | "GRS Type III"— Parts by Weight (solids basis) |
|---|---|---|
| Synthetic Rubber Latex | 36-56 | 18-58 |
| Phenol-formaldehyde Resin ("Plyophen 5015") | 60-40 | 80-40 |
| Vulcanizer | 4 | 2 |
| Water | (¹) | (¹) |

¹ Quantity sufficient.

In compounding the binding compositions, the liquid phenol-aldehyde resin and the synthetic rubber latex preferably first are diluted with a small amount (about ½ volume) of water, the water preferably being warm in order to avoid precipitation of their content of solids. The diluted resin and latex then are admixed gradually and with stirring, it being preferred to add the resin to the latex, again to avoid precipitation of the solid content of these constituents. If vulcanizing agents are to be incorporated in the compositions, they may be added next with continued stirring. Agitation of the mixture is continued until thorough blending is obtained, additional quantities of water being added if it is desired further to reduce the viscosity. The composition then is ready for use.

The binding compositions of the invention prepared in a manner similar to that described above may be applied to the binding together of diverse sorts of particles, either mineral or vegetable. They are particularly applicable, however, to the binding together of particles of lignocellulosic materials, for example, wood fiber, sawdust or wood flour derived from trees of various species, either hard wood or soft wood. They are particularly useful in the production of hard, dense synthetic board products such as panel board, hard board and flooring and therefore are described with particular reference to these applications, although it is to be understood that it is not intended to limit their use thereto.

To prepare the wood flour or other base material for the pressing operation whereby it is converted to synthetic boards or other products, it is mixed with binder in substantially the proportions indicated in Table III.

TABLE III

Parts by weight—Solids
Base material _____ 60-99
Binder _____ 40- 1
Water, quantity sufficient.

The mixing operation may be carried out in mixers of conventional design adapted for either batch or continuous operation. It is preferred first to place the base material in the mixer, next to initiate the movement of the same, and then to add the binder gradually with continued agitation. After the addition of the binder has been completed, the agitation is continued for a time sufficient to insure dispersion of the binder throughout the mass. If the binder employed in a particular instance is too viscous to obtain the desired degree of coating in a reasonable mixing time, water as necessary may be added to reduce the viscosity to the desired level. After the mixing operation is complete, the mass comprising particles of base material coated with binder is removed from the mixer. If necessary, it is then dried either in the air or in a kiln to adjust its moisture content to a value appropriate for the particular pressing operation contemplated. If it is to be pressed between a screen and caul, the moisture content may be about 100% by weight or less, based on the weight of the solid mixture. If, on the other hand, it is to be pressed between a pair of cauls, the moisture content preferably should be reduced to a value of less than about 25% by weight.

The mixture of base material and binder then is placed in board making machines of conventional construction and pressed under conditions of time, temperature and pressure sufficient to cure the resinous constituent of the binder, vulcanize the synthetic rubber constituent of the same (if vulcanizer has been added) and to compress the mass to a board of the desired density. When producing a board having a density of between about 0.6 and about 1.3 and a final thickness of about ¼ inch, pressing at between about 100° C. and about 300° C. at pressures of between about 50 lbs. per square inch and about 500 lbs. per square inch for a time of between about two minutes and about 30 minutes may be required. In the usual case, in order to produce such a board it suffices to press the mixture for about 15 minutes at a temperature of about 165° C. and a pressure of about 200 pounds per square inch.

It is a further feature of the invention that in addition to being applicable to the fabrication of synthetic boards such as hard board, panel board and flooring, the hereindescribed compositions comprising binder and base material also may be applied as overlayers on pieces of lumber, plywood and the like. This practice has many advantages. The overlay itself provides a durable, water resistant surface of attractive appearance. It effectively coats over and conceals any blemishes and defects which may be present on the surface of the material over which it is applied. It fills in knot holes without the necessity of first cutting away the wood, around the knot hole, thus weakening the product. It also increases the thickness of the final product by the addition of a relatively low cost material of which wood waste is a primary constituent, thus increasing the market value of the overlaid product.

The compositions which may thus be employed in the manufacture of overlaid products are prepared by mixing together binder and wood flour or other base material in the manner described above. They then are spread upon a piece of plywood, lumber, or other backing material which it is desired to overlay, the thickness of the spread being determined by the thickness desired in the overlaid product. To prevent possible separation of the overlay from the material to which it is applied, it is preferred to coat the latter before applying the overlaying composition with a suitable adhesive, which preferably comprises a thermosetting phenol-aldehyde resin. The piece of plywood or lumber bearing the superimposed overlaying composition then is placed in a press and consolidated under substantially the conditions described above for the production of hard boards etc., i. e., at between about 50 lbs. and about 300 lbs. per square inch at between about 100° C. and about 300° C. for from about 2 minutes to about 30 minutes.

The synthetic board products produced in accordance with the method of the invention are characterized by high impact resistance, low water absorption, low coefficients of thickness swelling and edge swelling (when exposed to moisture), and flexural strengths which are well within the acceptable range for hard board, panel board and flooring. In fact, the impact strength of boards prepared using the synthetic rubber-phenol aldehyde binding compositions of the invention are higher, and the tendency to absorb water and to swell upon exposure to moisture are lower, than in the case of boards prepared under the same conditions using a binder comprising a phenol-aldehyde resin alone, or a binder comprising a synthetic rubber alone. This indicates a co-action between the constituents of the hereindescribed binding compositions to form a new and unusually effective binding material. The low degree of edge swelling when placed in water is of particular interest, since it is of the greatest importance that constructional materials such as panel board do not swell upon exposure to moisture, with resultant warping and buckling.

The properties of the hereindescribed board products are further indicated in the following examples in which wood flour (through 20-mesh) was mixed with binders having the indicated compositions and prepared in the manner described above, the resulting mixture being dried to a moisture content of less than 25% by weight and pressed between platens at a temperature of 165° C. at a pressure of 200 pounds per square inch for a time of 15 minutes. The boards formed then were subjected to standard flexural strength tests and standard Izod impact resistance tests as well as to tests designed to measure the water absorption and swelling characteristics of the boards.

The water absorption, thickness swelling and edge swelling tests were carried out on samples having approximate dimensions of ½" x 6". These were weighed, measured accurately, and soaked in water at a temperature of about 75° F. for 24 hours. They then were removed from the water and again weighed and measured. The water absorption was calculated as the increase in weight, expressed as percent of the original weight; the thickness swelling as the increase in thickness, expressed as percent of the original thickness; and the edge swelling as the increase in length or width of the samples expressed as percent of their original length or width. In all of the examples, the relative amounts of the constituents of the board making mixture are expressed as parts by weight, on a solids basis, and the expressed amount of copolymer includes about 10% by weight of vulcanizing agent.

The following examples illustrate the effect of butadiene-acrylonitrile copolymers in the binding compositions of the present invention:

TABLE IV

| Example | 1—Phenol-Formaldehyde Resin[1]—20; Wood Flour—80 | 2—Butadiene-Acrylonitrile Copolymer[2]—20; Wood Flour—80 | 3—Butadiene-Acrylonitrile Copolymer[2]—10; Phenol-Formaldehyde[1] Resin—10; Wood Flour—80 |
|---|---|---|---|
| Flexural Strength (p. s. i.) (Modulus of rupture on bending) | 5,100 | 1,410 | 3,580 |
| Impact Resistance (Notched Izod) | 0.35 | 0.88 | 0.63 |
| Water Absorption (Percent) | 36.6 | 33.4 | 20.3 |
| Thickness Swelling (Percent) | 11.1 | 19.9 | 8.0 |
| Edge Swelling (Percent) | 0.4 | 1.2 | 0.6 |

[1] "Durez 13461"; water miscible phenolic resin containing 65 percent solids by weight.
[2] "Hycar OR25"; see Table I.

The following examples illustrate the effect of butadiene-styrene copolymers in the binding compositions of the present invention:

TABLE V

| Example | 4—Phenol-Formaldehyde Resin[1]—20; Wood Flour—80 | 5—Butadiene-Styrene Copolymer[2]—20; Wood Flour—80 | 6—Phenol-Formaldehyde Resin[1]—10; Butadiene-Styrene Copolymer[2]—10; Wood Flour—80 | 7—Phenol-Formaldehyde Resin[1]—15; Butadiene-Styrene Copolymer[2]—5; Wood Flour—80 |
|---|---|---|---|---|
| Flexural Strength (p. s. i.) (Modulus of rupture on bending) | 2,680 | Less than 500. | 1,580 | 1,610 |
| Impact Resistance (Notched Izod) | 0.22 | 0.77 | 0.44 | 0.30 |
| Water Absorption (Percent) | 45.4 | 26.2 | 27.1 | 13.9 |
| Thickness Swelling (Percent) | 6.1 | 18.4 | 7.3 | 5.8 |
| Edge Swelling (Percent) | 0.4 | 1.6 | 0.4 | 0.4 |

[1] "Plyophen 5015"; water miscible phenolic containing 68–70% solids by weight.
[2] "GRS III"; see Table I.

The following examples illustrate the effect of the chloroprene type synthetic rubbers in the binding compositions of the present invention:

TABLE VI

| Example | 8—Phenol-Aldehyde Resin 1—20; Wood Flour—80 | 9—Chloroprene—20; Wood Flour—80 | 10—Phenol-Formaldehyde Resin 1—10; Chloroprene 2—10; Wood Flour—80 |
|---|---|---|---|
| Flexural Strength (p. s. i.) (Modulus of rupture on bending) | 2,680 | 1,610 | 3,720 |
| Impact Resistance (Notched Izod) | 0.22 | 0.54 | 0.4 |
| Water Absorption (percent) | 45.4 | 46.3 | 23.3 |
| Thickness Swelling (percent) | 6.1 | 20.8 | 7.6 |
| Edge Swelling (percent) | 0.4 | 0.8 | 0.4 |

1 "Polyophen 5015."
2 "Neoprene 571"; latex containing 49% solids by weight.

The following examples illustrate the use of polyvinyl chloride copolymers in the binding compositions of the present invention:

TABLE VII

| Example | 11—Phenol-Aldehyde Resin 1—20; Wood Flour (through 20 mesh)—80 | 12—polyvinyl chloride 2—20; Wood Flour (through 20 mesh)—80 | 13—Polyvinyl Chloride 2—10; Phenol Formaldehyde Resin 1—10; Wood Flour (through 20 mesh)—80 |
|---|---|---|---|
| Flexural Strength (p. s. i.) (Modulus of rupture on bending) | 2,680 | 790 | 2,900 |
| Impact Resistance (Notched Izod) | 0.22 | 0.31 | 0.30 |
| Water Absorption (percent) | 45.4 | 60.8 | 20.8 |
| Thickness Swelling (percent) | 6.1 | 18.0 | 5.2 |
| Edge Swelling (percent) | 0.4 | 1.4 | 0.8 |

1 "Plyophen 5015."
2 "Geon 15X."

The following example illustrates the application of the compositions of the invention to the fabrication of overlaid boards:

*Example 14*

A composition having constituents as indicated in Table VIII was compounded in the manner described above in connection with Examples 1 to 13 inclusive.

TABLE VIII

Parts by weight
Butadiene-styrene copolymer ("GRS III") __ 9
Vulcanizing agent _____ 1
Phenol-aldehyde resin ("Plyophen 5015") ___ 10
Wood flour (through 20 mesh) _____ 80

After compounding, the composition was spread in a layer about ¼ inch in thickness on the surface of a piece of plywood which previously had been coated with a thermosetting phenol-formaldehyde resinous adhesive. The plywood with the superimposed composition then was placed in a press and pressed at 200 p. s. i. and 165° C. for 10 minutes, whereupon it was removed from the press and cooled.

As a result of the foregoing procedure there was formed a board having a relatively dense overlay of attractive appearance securely affixed to one of its faces. The board showed no tendency to delaminate nor to warp upon prolonged exposure to atmospheric conditions despite the fact that it was of "unbalanced" construction in that it had an overlay on one face only. In addition, it could be nailed, painted and readily worked with ordinary woodworking tools.

It is apparent from a consideration of the foregoing disclosure that the present invention provides binding compositions which may be used in the production of synthetic board products having strength and impact resistance characteristics which are well within the commercial range for hard board, panel board and flooring, and which have improved characteristics of water absorption and swelling as compared with products incorporating comparable quantities of phenol-aldehyde resin alone or synthetic rubber latex alone. These desirable results may be obtained using the relatively inexpensive butadiene-styrene type of copolymers which heretofore have not been considered applicable for use together with phenol-aldehyde resins because of the apparent incompatibility of the two materials. Furthermore, they are obtainable even when using as a base material such finely divided products as sawdust and through 20-mesh wood flour, which is essentially a dust, and which heretofore has not been considered suitable for use as a raw material for the manufacture of boards having desirable properties for many ordinary commercial uses. This is a fact of considerable economic significance, since it enables utilization on a commercial scale of sawdust and wood flour, both of which are low cost materials available in large quantities as by-products of the lumber industry.

Having now described our invention in preferred embodiments what we claim as new and desire to protect by Letters Patent is:

1. The method of making constructional board products which include at least one synthetic surface portion on each constructional board comprising mixing a water soluble phenol per se formaldehyde resinous condensation product and a synthetic elastomer therefor in latex form to form a binding admixture, said elastomer being selected from the group consisting of butadiene-acrylonitrile copolymer, butadiene-styrene copolymer, 2-chlorobutadiene-1,3 polymer and vinyl chloride polymer; mixing said admixture with relatively small pieces of lignocellulosic material to form an aggregate; and subsequently heating and pressing said aggregate to consolidate the same at temperatures of between about 100° C. and about 300° C. and at pressures of between about 50 lbs. per square inch and about 500 lbs. per square inch and for about 2 minutes to about 30 minutes.

2. The method of making constructional board products which include at least one synthetic surface portion on each constructional board comprising mixing a water soluble phenol per se formaldehyde resinous condensation product and a synthetic elastomer therefor in latex form to form a binding admixture, said elastomer being selected from the group consisting of butadiene-acrylonitrile copolymer, butadiene-styrene copolymer, 2-chlorobutadiene-1,3 polymer and vinyl chloride polymer; mixing said admixture with relatively small pieces of lignocellulosic material to form an aggregate; and subsequently heating and pressing said aggregate to consolidate the same at a temperature of about 165° C. and at a pressure of about 200 lbs. per square inch and for a time period of about 15 minutes.

3. The method of making synthetic constructional board products which comprises mixing a water soluble phenol per se formaldehyde resinous condensation product and a synthetic elastomer in latex form to form a binding admixture, said synthetic elastomer being selected from the group consisting of butadiene-acrylonitrile copolymer, butadiene-styrene copolymer, and 2-chlorobutadiene-1,3 polymer and vinyl chloride polymer; mixing the said admixture with relatively small pieces of lignocellulosic material to form an aggregate; and subsequently heating and pressing said aggregate at temperatures of between about 100° C. and about 300° C. and at pressures of between about 50 lbs. per square inch and about 500 lbs. per square inch for a time of between about 2 minutes and about 30 minutes to form a synthetic constructional board product.

4. The method of making synthetic constructional board products which comprises mixing a water soluble phenol per se formaldehyde resinous condensation product with a butadiene-acrylonitrile copolymer in latex form to form a binding admixture, mixing said admixture with relatively small pieces of lignocellulosic material to form an aggregate, and subsequently heating and pressing said aggregate at temperatures of between about 100° C. and about 300° C. and at pressures of between about 50 lbs. per square inch and about 500 lbs. per square inch and for about 2 minutes to about 30 minutes to form a synthetic constructional board product.

5. The method of making synthetic constructional board products which comprises mixing a water soluble phenol per se formaldehyde resinous condensation product with a butadiene-styrene copolymer in latex form to form a binding admixture, mixing said admixture with relatively small pieces of lignocellulosic material to form an aggregate, and subsequently heating and pressing said aggregate at temperatures of between about 100° C. and about 300° C. and at pressures of between about 50 lbs. per square inch and about 500 lbs. per square inch and for about 2 minutes to about 30 minutes to form a synthetic constructional board product.

6. The method of making synthetic constructional board products which comprises mixing a water soluble phenol per se formaldehyde resinous condensation product with a 2-chlorobutadiene-1,3 polymer in latex form to form a binding admixture, mixing said admixture with relatively small pieces of lignocellulosic material to form an aggregate, and subsequently heating and pressing said aggregate at temperatures of between about 100° C. and about 300° C. and at pressures of between about 50 lbs. per square inch and about 500 lbs. per square inch and for about 2 minutes to about 30 minutes to form a synthetic constructional board product.

7. The method of making synthetic constructional board products which comprises mixing a water soluble phenol per se formaldehyde resinous condensation product with a vinyl chloride polymer in latex form to form a binding admixture, mixing said admixture with relatively small pieces of lignocellulosic material to form an aggregate, and subsequently heating and pressing said aggregate at temperatures of between about 100° C. and about 300° C. and at pressures of between about 50 lbs. per square inch and about 500 lbs. per square inch and for about 2 minutes to about 30 minutes to form a synthetic constructional board product.

8. The method of making constructional board products which include at least one synthetic surface portion on each constructional board comprising mixing a water soluble phenol per se formaldehyde resinous condensation product, a synthetic elastomer therefore in latex form, said elastomer being selected from the group consisting of butadiene-acrylonitrile copolymer, butadiene-styrene copolymer, 2-chlorobutadiene-1,3 polymer and vinyl chloride polymer, and a vulcanizing agent for said synthetic elastomer, to form a binding admixture; mixing said admixture with relatively small pieces of lignocellulosic material to form an aggregate; and subsequently heating and pressing said aggregate to consolidate the same at temperatures of between about 100° C. and about 300° C. and at pressures of between about 50 lbs. per square inch and about 500 lbs. per square inch and for about 2 minutes to about 30 minutes.

9. The method of making constructional board products which includes at least one synthetic surface portion on each constructional board comprising mixing a water soluble phenol per se formaldedyde resinous condensation product and a synthetic elastomer therefor in latex form to form a binding admixture, said elastomer being selected from the group consisting of butadiene-acrylonitrile copolymer, butadiene-styrene copolymer, 2-chlorobutadiene-1,3 polymer and vinyl chloride polymer; mixing said admixture with reltaively small pieces of lignocellulosic material to form an aggregate; said admixture constituting up to about 40% by weight on a solids basis (based on the total weight of the aggregate); and subsequently heating and pressing said aggregate to consolidate the same at temperatures of between about 100° C. and about 300° C. and at pressures of between about 50 lbs. per square inch and about 500 lbs. per square inch and for about 2 minutes to about 30 minutes.

10. The method of making a constructional board product having an overlaid synthetic surface portion comprising mixing a water soluble phenol per se formaldehyde resinous condensation product and a synthetic elastomer therefor in latex form to form a binding admixture, said elastomer being selected from the group consisting of butadiene-acrylonitrile copolymer, butadiene-styrene copolymer, 2-chlorobutadiene-1,3 polymer and vinyl chloride polymer; mixing said admixture with relatively small pieces of lignocellulosic material to form an aggregate; providing a lignocellulosic backing material; superimposing a quantity of said aggregate on said backing material to form a composite product; and subsequently heating and pressing said composite product to consolidate the said aggregate and cause its adherence to the backing material, said heating and pressing employing therein temperatures of between about 100° C. and about 300° C. and pressures of between about 50 lbs. per square inch and about 300 lbs. per square inch and a period of about two minutes to about thirty minutes.

11. The method of making a constructional board product having an overlaid synthetic surface portion comprising mixing a water soluble phenol per se formaldehyde resinous condensation product and a synthetic elastomer therefor in latex form to form a binding admixture, said elastomer being selected from the group consisting of butadiene-acrylonitrile copolymer, butadiene-styrene copolymer, 2-chlorobutadiene-1,3 polymer and vinyl chloride polymer; mixing said admixture with relatively small pieces of lignocellulosic material to form an aggregate; providing a lignocellulosic backing material; coating one face of said backing material with a thermosetting adhesive; superimposing a quantity of said aggregate on said one face of said backing material to form a composite product; and subsequently heating and pressing said composite product to consolidate the said aggregate and cause its adherence to the backing material, said heating and pressing employing therein temperatures of between about 100° C. and about 300° C. and pressures of between about 50 lbs. per square inch and about 300 lbs. per square inch and a period of about two minutes to about thirty minutes.

12. The method of making a constructional board product having an overlaid synthetic surface portion comprising mixing a water soluble phenol per se formaldehyde resinous condensation product and a synthetic elastomer therefor in latex form to form a binding admixture, said elastomer comprising a butadiene-acrylonitrile copolymer; mixing said admixture with relatively small pieces of lignocellulosic material to form an aggregate; providing a lignocellulosic backing material; superimposing a quantity of said aggregate on said backing material to form a composite product; and subsequently heating and pressing said composite product to consolidate the said aggregate and cause its adherence to the backing material, said heating and pressing employing therein temperatures of between about 100° C. and about 300° C. and pressures of between about 50 lbs. per square inch and about 300 lbs. per square inch and a period of about two minutes to about thirty minutes.

13. The method of making a constructional board product having an overlaid synthetic surface portion comprising mixing a water soluble phenol per se formaldehyde resinous condensation product and a synthetic elastomer therefor in latex form to form a binding admixture, said elastomer comprising a butadiene-styrene copolymer; mixing said admixture with relatively small pieces of lignocellulosic material to form an aggregate; providing a lignocellulosic backing material; superimposing a quantity of said aggregate on said backing material to form a composite product; and subsequently heating and pressing said composite product to consolidate the said aggregate and cause its adherence to the backing material, said heating and pressing employing therein temperatures of between about 100° C. and about 300° C. and pressures of between about 50 lbs. per square inch and a period of about two minutes to about thirty minutes.

14. The method of making a constructional board product having an overlaid synthetic surface portion comprising mixing a water soluble phenol per se formaldehyde resinous condensation product and a synthetic elastomer therefor in latex form to form a binding admixture, said elastomer comprising a 2-chlorobutadiene-1,3 polymer; mixing said admixture with relatively small pieces of lignocellulosic material to form an aggregate; providing a lignocellulosic backing material; superimposing a quantity of said aggregate on said backing material to form a composite product; and subsequently heating and pressing said composite product to consolidate the said aggregate and cause its adherence to the backing material, said heating and pressing employing therein temperatures of between about 100° C. and about 300° C. and pressures of between about 50 lbs. per square inch and about 300 lbs. per square inch and a period of about two minutes to about thirty minutes.

15. The method of making a constructional board product having an overlaid synthetic surface portion comprising mixing a water soluble phenol per se formaldehyde resinous condensation product and a synthetic elastomer therefor in latex form to form a binding admixture, said elastomer comprising a vinyl chloride polymer; mixing said admixture with relatively small pieces of lignocellulosic material to form an aggregate; providing a lignocellulosic backing material; superimposing a quantity of said aggregate on said backing material to form a composite product; and subsequently heating and pressing said composite product to consolidate the said aggregate and cause its adherence to the backing material, said heating and pressing employing therein temperatures of between about 100° C. and about 300° C. and pressures of between about 50 lbs. per square inch and about 300 lbs. per square inch and a period of about two minutes to about thirty minutes.

16. As a new article of manufacture, the synthetic constructional board products comprising an aggregate formed from relatively small pieces of lignocellulosic material and a binding admixture comprising a water soluble phenol per se formaldehyde resinous condensation product and a synthetic elastomer therefor in latex form, said elastomer comprising an elastomer compatible with the phenol-formaldehyde resinous condensation product and selected from the group consisting of butadiene-acrylonitrile copolymer, butadiene-styrene copolymer, 2-chlorobutadiene-1,3 polymer and vinyl chloride polymer, said aggregate having been consolidated into a constructional board by the action of heat and pressure employing therein temperatures of between about 100° C. and about 300° C. and pressures of between about 50 lbs. per square inch and about 500 lbs. per square inch and a period of about 2 minutes to about 30 minutes.

17. As a new article of manufacture, the synthetic constructional board products comprising an aggregate formed from relatively small pieces of lignocellulosic material and a binding admixture comprising a water soluble phenol per se formaldehyde resinous condensation product and a synthetic elastomer therefor in latex form, said elastomer comprising a butadiene-acrylonitrile copolymer, said aggregate having been consolidated into a constructional board by the action of heat and pressure employing therein temperatures of between about 100° C. and about 300° C. and pressures of between about 50 lbs. per square inch and about 500 lbs. per square inch and a period of about 2 minutes to about 30 minutes.

18. As a new article of manufacture, the synthetic constructional board products comprising an aggregate formed from relatively small pieces of lignocellulosic material and a binding admixture comprising a water soluble phenol per se formaldehyde resinous condensation product and a synthetic elastomer therefor in latex form, said elastomer comprising a butadiene-styrene copolymer, said aggregate having been consolidated into a constructional board by the action of heat and pressure employing therein temperatures of between about 100° C. and about 300° C. and pressures of between about 50 lbs. per square inch and about 500 lbs. per square inch and a period of about 2 minutes to about 30 minutes.

19. As a new article of manufacture, the synthetic constructional board products comprising an aggregate formed from relatively small pieces of lignocellulosic material and a binding admixture comprising a water soluble phenol per se formaldehyde resinous condensation product and a synthetic elastomer therefor in latex form, said elastomer comprising a 2-chlorobutadiene-1,3 polymer, said aggregate having been consolidated into a constructional board by the action of heat and pressure employing therein temperatures of between about 100° C. and about 300° C. and pressures of between about 50 lbs. per square inch and about 500 lbs. per square inch and a period of about 2 minutes to about 30 minutes.

20. As a new article of manufacture, the synthetic constructional board products comprising an aggregate formed from relatively small pieces of lignocellulosic material and a binding admixture comprising a water soluble phenol per se formaldehyde resinous condensation product and a synthetic elastomer therefor in latex form, said elastomer comprising a vinyl chloride polymer, said aggregate having been consolidated into a constructional board by the action of heat and pressure employing therein temperatures of between about 100° C. and about 300° C. and pressures of between about 50 lbs. per square inch and about 500 lbs. per square inch and a period of about 2 minutes to about 30 minutes.

21. As a new article of manufacture, a constructional board having an overlaid synthetic surface portion comprising a lignocellulosic backing material, having a superimposed layer comprising an aggregate formed from relatively small pieces of lignocellulosic material and a binding admixture therefor comprising a water soluble phenol per se formaldehyde resinous condensation product and a synthetic elastomer therefor in latex form, said elastomer comprising an elastomer compatible with the phenol-formaldehyde resinous condensation product and selected from the group consisting of butadiene-acrylonitrile copolymer, butadiene-styrene copolymer, 2-chlorobutadiene-1,3 polymer and vinyl chloride polymer, said aggregate having been consolidated and caused to adhere to said backing material by the action of heat and pressure employing therein temperatures of between about 100° C. and about 300° C. and pressures of between about 50 lbs. per square inch and about 500 lbs. per square inch and a period of about 2 minutes to about 30 minutes.

22. As a new article of manufacture, a constructional board having an overlaid synthetic surface portion comprising a lignocellulosic backing material, having a superimposed layer comprising an aggregate formed from relatively small pieces of lignocellulosic material and a binding admixture therefor comprising a water soluble phenol per se formaldehyde resinous condensation product and a synthetic elastomer therefor in latex form, said elastomer comprising a butadiene-acrylonitrile copolymer, said aggregate having been consolidated and caused to adhere to said backing material by the action of heat and pressure employing therein temperatures of between about 100° C. and about 300° C. and pressures of between about 50 lbs. per square inch and about 500 lbs. per square inch and a period of about 2 minutes to about 30 minutes.

23. As a new article of manufacture, a constructional board having an overlaid synthetic surface portion comprising a lignocellulosic backing material, having a superimposed layer comprising an aggregate formed from relatively small pieces of lignocellulosic material and a binding admixture therefor comprising a water soluble phenol per se formaldehyde resinous condensation product and a synthetic elastomer therefor in latex form, said elastomer comprising a butadiene-styrene copolymer, said aggregate having been consolidated and caused to adhere to said backing material by the action of heat and pressure employing therein temperatures of between about 100° C. and about 300° C. and pressures of between about 50 lbs. per square inch and about 500 lbs. per square inch and a period of about 2 minutes to about 30 minutes.

24. As a new article of manufacture, a constructional board having an overlaid synthetic surface portion comprising a lignocellulosic backing material, having a superimposed layer comprising an aggregate formed from relatively small pieces of lignocellulosic material and a binding admixture therefor comprising a water soluble phenol per se formaldehyde resinous condensation product and a synthetic elastomer therefor in latex form, said elastomer comprising a 2-chlorobutadiene-1,3 polymer, said aggregate having been consolidated and caused to adhere to said backing material by the action of heat and pressure employing therein temperatures of between about 100° C. and about 300° C. and pressures of between about 50 lbs. per square inch and about 500 lbs. per square inch and a period of about 2 minutes to about 30 minutes.

25. As a new article of manufacture, a constructional board having an overlaid synthetic surface portion comprising a lignocellulosic backing material, having a superimposed layer comprising an aggregate formed from relatively small pieces of lignocellulosic material and a binding admixture therefor comprising a water soluble phenol per se formaldehyde resinous condensation product and a synthetic elastomer therefor in latex form, said elastomer comprising a vinyl chloride polymer, said aggregate having been consolidated and caused to adhere to said backing material by the action of heat and pressure employing therein temperatures of between about 100° C. and about 300° C. and pressures of between about 50 lbs. per square inch and about 500 lbs. per square inch and a period of about 2 minutes to about 30 minutes.

JOHN G. MEILER.
EARL G. HALLONQUIST.
AUGUST H. RAUCH.

References Cited in the file of this patent

UNITED STATES PATENTS

| Number | Name | Date |
| --- | --- | --- |
| 1,855,384 | Cheetham | Apr. 26, 1932 |
| 2,128,635 | Charch | Aug. 30, 1938 |
| 2,277,941 | Almy | Mar. 21, 1942 |
| 2,335,321 | Szegvari | Nov. 30, 1943 |
| 2,354,426 | Briant | July 25, 1944 |
| 2,429,397 | Compton | Oct. 21, 1947 |
| 2,481,879 | Ross | Sept. 13, 1949 |
| 2,492,488 | Kremer | Dec. 27, 1949 |
| 2,550,143 | Eger | Apr. 24, 1951 |

FOREIGN PATENTS

| Number | Country | Date |
| --- | --- | --- |
| 511,368 | Great Britain | Aug. 17, 1939 |